(12) United States Patent
Lane

(10) Patent No.: US 7,946,605 B2
(45) Date of Patent: *May 24, 2011

(54) AERODYNAMIC TIME TRIAL BIKE

(75) Inventor: Timothy Saul Lane, Aliso Viejo, CA (US)

(73) Assignee: Felt Racing, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/512,190

(22) Filed: Jul. 30, 2009

(65) Prior Publication Data

US 2009/0289436 A1  Nov. 26, 2009

Related U.S. Application Data

(63) Continuation of application No. 11/786,940, filed on Apr. 13, 2007, now Pat. No. 7,614,634.

(51) Int. Cl.
*B62J 9/00* (2006.01)

(52) U.S. Cl. .................. 280/288.4; 280/281.1; 280/274; 188/24.12; 188/24.19

(58) Field of Classification Search ............... 280/288.4, 280/274, 281.1, 288; 188/264
See application file for complete search history.

(56) References Cited

U.S. PATENT DOCUMENTS

| | | | |
|---|---|---|---|
| 0,371,266 A | 10/1887 | Knous | |
| 2,756,070 A | 4/1951 | Torre | |
| 2,687,898 A | 8/1954 | Schwinn | |
| 2,717,662 A | 9/1955 | Thompson | |
| 2,809,053 A | 10/1957 | Pletscher | |
| 4,008,903 A | 2/1977 | Ramond | |
| 4,136,759 A * | 1/1979 | Schoch | 188/24.12 |
| 4,189,167 A | 2/1980 | Dubois | |
| 4,453,730 A * | 6/1984 | Klose | 280/281.1 |
| 4,939,950 A | 7/1990 | Girvin | |
| 5,039,470 A | 8/1991 | Bezin et al. | |
| 5,429,381 A | 7/1995 | Mercat et al. | |
| 6,325,401 B1 | 12/2001 | Fujii | |
| 6,889,992 B2 * | 5/2005 | Vroomen et al. | 280/274 |
| 7,000,936 B2 | 2/2006 | Schmider | |
| 7,104,562 B2 | 9/2006 | Schmider et al. | |
| 7,140,628 B2 * | 11/2006 | Parkin | 280/281.1 |
| 2002/0033586 A1 | 3/2002 | Vroomen et al. | |
| 2002/0038944 A1 * | 4/2002 | Lawwill et al. | 280/284 |
| 2004/0011598 A1 | 1/2004 | Hermansen et al. | |
| 2005/0006873 A1 * | 1/2005 | Kaburagi et al. | 280/288 |

(Continued)

FOREIGN PATENT DOCUMENTS

EP  1612134  6/2004

OTHER PUBLICATIONS

Photo from First Flight Bikes website showing center-pull cantilever U-brake mounted under chainstays of bike; Taken from www.firstilightbikes.com/YelFisherCrank.jpg; Jul. 26, 2007.

(Continued)

*Primary Examiner* — Joanne Silbermann
*Assistant Examiner* — Tashiana Adams
(74) *Attorney, Agent, or Firm* — Stetina Brunda Garred & Brucker

(57) ABSTRACT

An aerodynamic racing bicycle is provided. The racing bicycle may have a rear rim brake positioned below a drive portion of a chain and above a chain stay for reducing the aerodynamic drag on the bicycle.

20 Claims, 3 Drawing Sheets

U.S. PATENT DOCUMENTS

| | | |
|---|---|---|
| 2006/0145446 A1* | 7/2006 | Schmider .................. 280/281.1 |
| 2007/0023237 A1* | 2/2007 | Nago ........................ 188/24.12 |
| 2007/0068744 A1 | 3/2007 | Tsai |
| 2008/0035431 A1 | 2/2008 | Vroomen et al. |
| 2008/0036170 A1 | 2/2008 | Vroomen et al. |
| 2008/0252039 A1 | 10/2008 | Lane |

OTHER PUBLICATIONS

Photo of Felt Racing Ethic Bicycle; www.feltbmx.com; Jul. 26, 2007.

Slowtwitch.com; Hooker Elite Bicycle; www.slowtwitch/mainheadings/features/hookers/hooker.html; Copyright 2002, 2003, 2004.

Slowtwitch.com; Tri Bikes; www.slowtwitch.com/mainheadings/product2007/tribikes/felt.html; Copyright 2002, 2003, 2004.

Hone Design; Frame Information; www.honedesign.com/sites/zipp/2002/technology/frames/index.html; Jul. 26, 2007.

Bicycle photo from www.softride.com; Jul. 26, 2007.

* cited by examiner

AERODYNAMIC TIME TRIAL BIKE

CROSS-REFERENCE TO RELATED APPLICATIONS

The present application is a continuation of U.S. patent application Ser. No. 11/786,940 entitled AERODYNAMIC TIME TRIAL BIKE filed Apr. 13, 2007 now U.S. Pat. No. 7,614,634.

STATEMENT RE: FEDERALLY SPONSORED RESEARCH/DEVELOPMENT

Not Applicable

BACKGROUND

The present invention relates to a standard side pull rear rim brake caliper positioned below a drive portion of a chain and above the chain stays of a bicycle with a brake actuating arm positioned on a non drive side of the bicycle and away from operation of the front derailleur and chain drive components.

A modern bicycle may be designed with consideration for the aerodynamic drag on the bicycle. Reducing the aerodynamic drag allows increased speed without increased effort by the rider. One portion of the bicycle that creates drag is the rear rim brake.

The rear rim brake is typically mounted to seat stays of the bicycle frame. While the bicycle moves forward, the rear rim brake moves through the air creating aerodynamic drag. The reason is that due to functional requirements, standard side pull rim brake calipers that are common in the prior art are not shaped with particular regard for aerodynamic efficiency.

Prior art bicycles have rim brakes attached to different areas of the bicycle frame. For example, rear rim brakes have been attached to the underside of the bottom bracket region; unfortunately, when positioned in this location the cable actuating arm for the standard side pull rear rim brake caliper will be located on the drive side (i.e., sprocket side) of the bicycle. The sprockets and chain and derailleurs occupy the space that is required to route the cable to the rear rim brake and in which the brake actuating arm must operate. As such, the drive components interfere with the operation of the standard side pull rear rim brake. To overcome the insufficient amount of space on the drive side of the bicycle, prior art bicycles have used center pull rear rim brakes or custom-made rear rim brakes with the rear rim brake actuating arm on the opposite side of the caliper compared to the standard side pull rear rim brake. This allows the rear rim brake actuating arm to be positioned on the non-drive side of the bicycle such that the cable and rear brake caliper have space to operate. Unfortunately, such custom rear brakes are not common, and thus, replacement parts are not readily available.

Accordingly, there is a need in the art for an improved aerodynamic racing bicycle.

BRIEF SUMMARY

The bicycle frame discussed herein addresses the needs discussed above, discussed below and those that are known in the art.

A bicycle frame is provided wherein a standard side pull rear rim brake may be positioned below a drive portion of a chain and above chain stays of the bicycle frame. Another method of reducing aerodynamic drag is to shape the front surface of the frame so as to be aerodynamically shaped such that the bicycle efficiently moves through the air. Since the rear rim brake may optionally be positioned behind the front surface of the bottom bracket region of the frame, air flowing around the frame may be deflected around the rear rim brake, thus increasing the aerodynamic drag on the bicycle less than is typical for a bicycle with the rear rim brake mounted to the seat stays.

Moreover, moving the rear rim brake from the first portion of the seat stays to between the drive portion of the chain and the chain stays has a cumulative effect of reducing the aerodynamic drag. The reason is that the airflow in the region adjacent the crank arms and the riders feet is already disturbed or otherwise not laminar. Positioning the rear brake in the bottom bracket region does not further increase the instability of the airflow in that area. As such, the standard side pull rear rim brake positioned between the drive portion of the chain and chain stays does not significantly increase the aerodynamic drag on the bicycle at the bottom bracket region. Moreover, moving the standard side pull rear rim brake away from the first portion of the seat stays to between the drive portion of the chain and chain stays decreases the aerodynamic drag at the first portion of the seat stays. As such, the overall aerodynamic drag on the bicycle is reduced.

Another advantage of mounting the standard side pull rear brake to between the drive portion of the chain and chain stay of the bicycle frame is that the seat stays may be made more flexible to improve the ride of the bicycle and also the bicycle performance. The ride of the bicycle may be improved because resilience in the seat stays can damp shocks imparted to the rear wheel of the bicycle. When the rear rim brake is mounted to the seat stays, the seat stays must be made sufficiently stiff to withstand the braking forces exerted by the rear rim brake. When the rear rim brake is mounted between the drive portion of the chain and the chain stays, the seat stays may be made more flexible to improve the ride of the bicycle and also the bicycle performance. Further, the seat stays may optionally be eliminated.

A further advantage of mounting the standard side pull rear brake to the bottom bracket region of the bicycle frame is that the mass of the brake and it's control mechanism is lower on the bicycle that than it would be were the brake mounted to the first portion of the seat stays (as is typical); this serves to lower the bicycles center of gravity, which is advantageous for good bicycle handling.

To mount the standard side pull rear brake above the chain stays and below a drive portion of chain, the front portion of the chain stays may optionally be sufficiently lowered to create additional space for the rear rim brake. By way of example and not limitation, typically, the bottom of the chain stay is level with the bottom of bottom bracket shell. However, to create the additional space, the front portion of the chain stay may be lowered such that the top of the chain stay is level with the bottom of the bottom bracket shell. If further additional space is required to position the standard side pull rear brake between the chain stays and the drive portion of the chain, the bottom bracket region (i.e., down tube or seat tube) may optionally be cut out or otherwise distorted.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
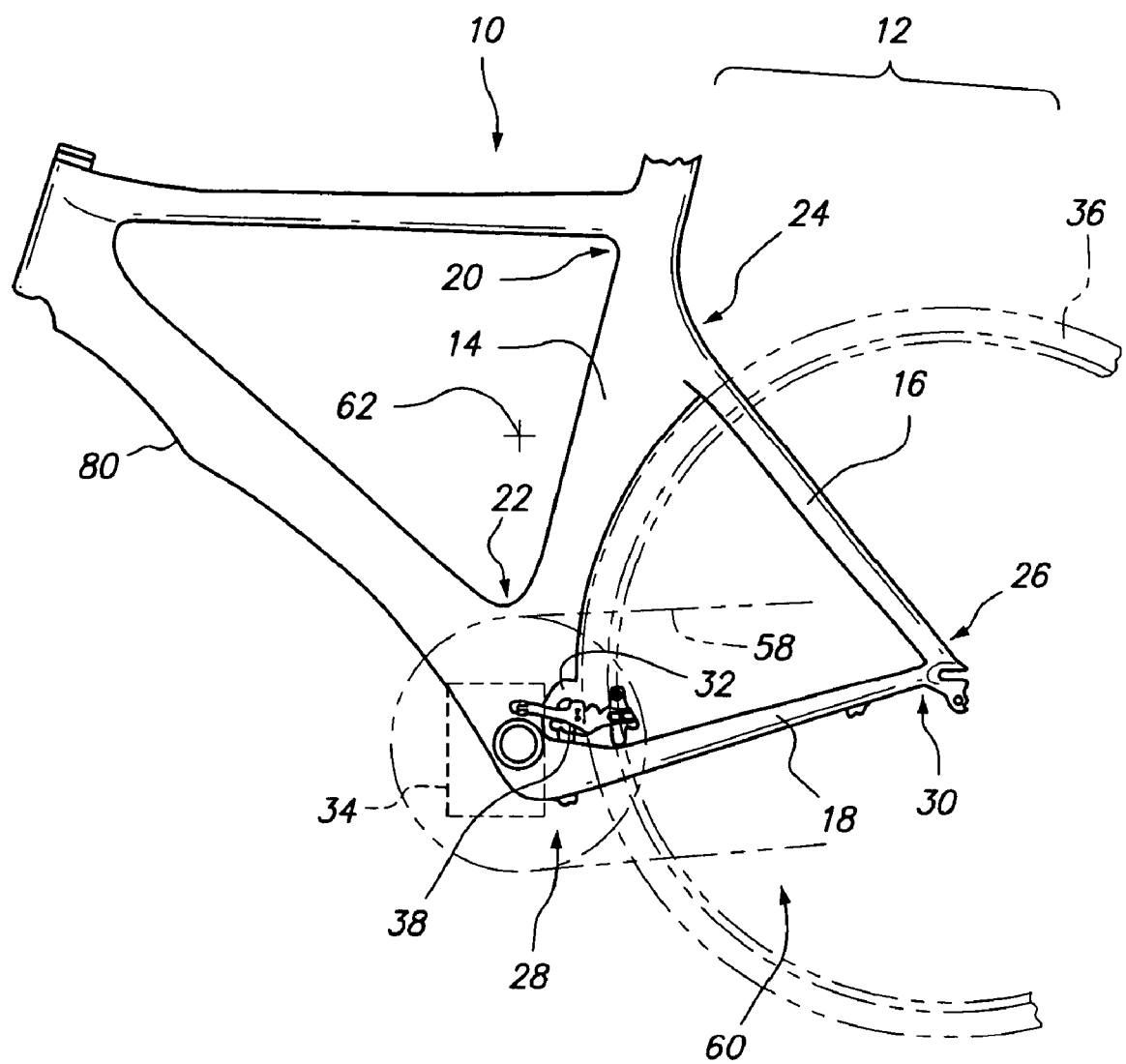
FIG. 1 is a side view of the a bicycle with a standard side pull rear rim brake positioned below a drive portion of a chain and above chain stays with a rear rim brake actuating arm positioned on a non drive side of the bicycle

Referring now to the figures, a bicycle frame 10 is shown. The bicycle frame is formed with a rear triangle portion 12 defined by a seat tube 14, one or more seat stays 16 and one or more chain stays 18. The seat tube 14, seat stays 16 and the chain stays 18 collectively form the rear triangle portion 12. More particularly, the seat tube 14 defines an upper portion 20 and a lower portion 22. Each of the seat stay 16 defines a first portion 24 and a second portion 26. The first portions 24 of the seat stays 16 are attached to the upper portion 20 of the seat tube 14. The chain stays 18 each define a front portion 28 and a rear portion 30. The front portions 28 of the chain stays 18 are attached to the lower portion 22 of the seat tube 14. The rear portions 30 of the chains stays 18 are attached to the second portions 26 of the seat stays 16. The various aspects of the invention will be discussed in relation to a bicycle frame having a seat tube 14 and chain stays 18. However, it is also contemplated that the various aspects of the invention may be employed in frames without a seat tube 14 and/or seat stays 16. It is also contemplated that the various aspects of the invention may be employed on a bicycle frame without traditional tubes but which is fabricated as a monocoque. As such, by way of example and not limitation, the various aspects of the invention are not to be limited to tubed frames or bicycle frames with a seat tube or seat stays.

The frame 10 may be fabricated such that a space 32 exists between a bottom bracket region 34 and a rear wheel 36. A bicycle rim brake 38 may be disposed in the space 32 for providing rear braking to the bicycle 40. By way of example and not limitation, the bicycle brake may be a standard side pull rear brake (e.g., Shimano BR-7800). The standard side pull rear rim brake 38 may have an actuating arm 69 which is located on a non-drive-side of the bicycle when mounted to the bicycle in a normal upright position. When the standard side pull rear rim brake 38 is disposed in the space 32, the standard side pull rear rim brake 38 may be disposed (1) above the chain stays 18 and below a drive portion 58 of a chain 60 and/or (2) optionally, behind a front surface of the bottom bracket region 34. As used herein, the phrase "front surface of the bottom bracket region" is the front surface of the portion of the down tube member or seat tube member disposed between lines running through the drive portion 58 of the chain 60 and the chain stays 18.

Positioning the bicycle brake 38 in the space 32 behind the front surface of the bottom bracket region 34 and/or between the chain stays 18 and the drive portion 58 of the chain 60 instead of at the first portion 24 of the seat stay 16 may reduce the aerodynamic drag on the bicycle 40 because the bicycle brake 38 so positioned does not further disturb flow of air passing by the bottom bracket region 34 but does decrease the aerodynamic drag near the first portions 24 of the seat stays 16. In particular, the bottom bracket region 34 houses a bottom bracket shell for a crank arm set or is formed as a bottom bracket shell for the crank arm set. The bottom bracket shell 42 houses the bicycle crank axle. The bicycle crank arms are rotating while the rider pedals to drive the bicycle forward. The rotation of the bicycle crank arm and the rider's feet disturbs the airflow around the bottom bracket region 34. The bicycle rear rim brake 38 positioned between the drive portion of the chain and the chain stays and/or behind the front surface of the bottom bracket region 34 does not increase the disturbance of air by the bottom bracket region 34 caused by presence of the bicycle crank arm and the rider's feet. As such, the positioning of the brake 38 behind the front surface of the bottom bracket region 34 and/or between the chain stays 18 and the drive portion 58 of the chain 60 does not significantly increase the aerodynamic drag around the bottom bracket region 34 while the removal of the rear rim brake 38 from the seat stays 16 (i.e., location where rear rim brake 38 is typically mounted) decreases the aerodynamic drag on the bicycle at the first portion 24 of the seat stays. Hence, the overall drag on the bicycle is decreased.

Figure 2:
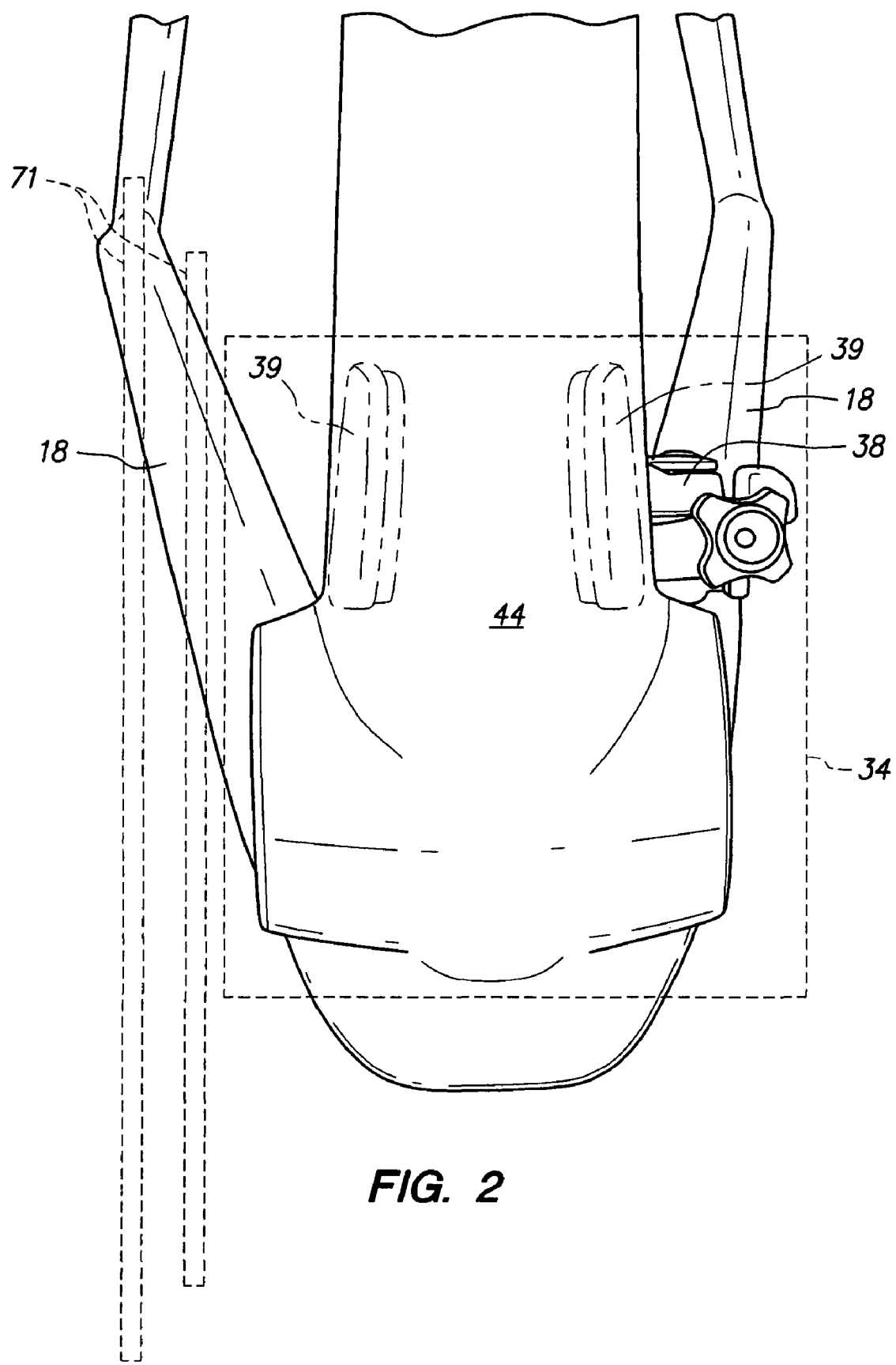
FIG. 2 is a front profile view of the bottom bracket region illustrating that some parts of the brake are behind the bottom bracket region, which may optionally be aerodynamically shaped to direct airflow away from around the brake.

As discussed herein, the bicycle rim brake 38 may be positioned behind the front surface of the bottom bracket region 34. The rider's feet and/or drive components are already disturbing the air adjacent the bottom bracket region 34 such that the presence of the rear rim brake 38 does not significantly further increase the aerodynamic drag on the bicycle adjacent the bottom bracket region 34. Furthermore, the front surface of the bottom bracket region may be aerodynamically shaped so as to efficiently move through the air while the bicycle is in motion. Since the rear brake 38 may be positioned behind the bottom bracket region 34 of the frame, air flowing around the front surface of the bottom bracket region 34 may be deflected around the brake 38, thus the rear rim brake 38 positioned behind the front surface of the bottom bracket region may not increase the total aerodynamic drag on the bicycle. In other words, positioning the rear brake behind the front surface of the bottom bracket region 34 may increase the aerodynamic drag on the bicycle at the bottom bracket region but less than the decrease in aerodynamic drag at the first portions 24 of the seat stays 16 caused by moving the rear rim brake 38 away from the seat stays to adjacent the bottom bracket region 34. As shown in FIG. 2, part of the bicycle brake 38 including the brake pads 39 may be positioned behind the front surface 44 of the bottom bracket region 34. This may be especially beneficial when the crank arms are not rotating and churning the air around the region of the bottom bracket region 34 since the air flowing past the bottom bracket region maintains a laminar flow (or less turbulent flow) when the crank arms are not rotating. In this manner, the front surface of the bottom bracket region 34 behaves as a windbreaker to the bicycle brake 38 because the front surface 44 of the bottom bracket region 34 is approximately equal to a front profile of the rear brake 38 as shown in FIG. 2. The front surface 44 of the bottom bracket region 34 moves through the air allowing the air flow to bypass the bicycle brake 38.

Positioning the bicycle brake 38 between the chain stays 18 and the drive portion 58 of the chain 60 (or optionally behind the front surface of the bottom bracket region) reduces the aerodynamic drag on the bicycle 40 around the first portions 24 of the seat stays 16 by reducing the disturbance to air flow around the upper portion of the bicycle. In contrast, in the prior art, when the rear brake is mounted to the seat stays, the air flow becomes disturbed when the air passes by the rear rim brake mounted to the seat stays. Thus, the disturbance to the flow of air past the first portions 24 of the seat stays 16 is greater when the rear rim brake 38 is mounted to the first portions 24 of the seat stays 16 compared to when the rear rim brake is positioned between the chain stays 18 and the drive portion 58 of the chain (or optionally behind the front surface of the bottom bracket region).

To provide for the space 32 such that the bicycle rear rim brake 38 may be positioned in the space 32 behind the front surface of the bottom bracket region 34 and/or between the chain stays 18 and drive portion 58 of the chain 60. The distance between the chain stays 18 and the drive portion of the chain 60 may be increased by lowering the front portion 28 of the chain stays 18. This may be achieved as shown in FIG. 1, where the chain stays 18 are tilted downward in the forward direction. By way of example and not limitation, the chain stays 18 may be tilted at least until a top of the front portion of the chain stays is level with the bottom of the bottom bracket shell. If the space 32 between the seat tube 14 and the outer diameter 46 of the rear wheel 36 is not large enough to fit the bicycle brake 38 therebetween, then a cutout 48 may be made in the lower portion 22 of the seat tube 14. The cutout 48 provides additional space 32 such that the bicycle brake 38 may be disposed above the chain stays 18 and below the drive portion 58 of the chain 60 (and/or behind the front surface of the bottom bracket region 34). Alternatively, the seat tube member might be distorted to provide additional space 32 such that the bicycle brake 38 may be disposed above the chain stays 18 and below the drive portion 58 of the chain 60 and/or behind the front surface of the bottom bracket region 34. In this manner, the standard side pull rear rim brake 38 may be mounted with the brake actuating arm 69 located on the non drive side of the bicycle (see FIG. 2) where there is room to operate the brake actuating arm 69 and mount the rear brake cable.

The bottom bracket region 34 is typically fabricated to be stiff. The reason is that the crank arms for powering the bicycle 40 place the bottom bracket region 34 under a great deal of stress when the rider is pedaling. The stiffness of the bottom bracket region 34 is typically sufficient to mount the bicycle brake 38 which also places a great deal of stress on the mounting area thereof due to the energy transferred to stop the bicycle 40. Since the bicycle brake 38 is now attached to the bottom bracket region 34, the upper portion 20 of the seat tube 14 and the first portions 24 of the seat stays 16 may be made less stiff or more flexible to provide additional comfort to the rider and better bicycle performance. Alternatively, the seat tube 14 and the seat stays 16 may be eliminated.

An advantage of lowering the front portion 28 of the chain stays 18 to provide the space 32 to fit the bicycle brake 38 is that the center of gravity 62 (see FIG. 1) is lowered. Positioning the bicycle brake 38 adjacent the bottom bracket region, rather than in the region of the first portions 24 of the seat stays 16 as is typical may also lower the center of gravity 62. Lowering the bicycles center of gravity 62 can be advantageous for bicycle riding stability.

The rear rim brake 38 may be mounted to the bottom bracket region 34 by forming a through hole 64 (see FIG. 1A) in the bottom bracket region 34. A threaded stem 65 of the rear brake 38 may be inserted through the through hole 64. A nut 67 may be tightened onto a threaded portion of the stem 65.

Figure 1A:
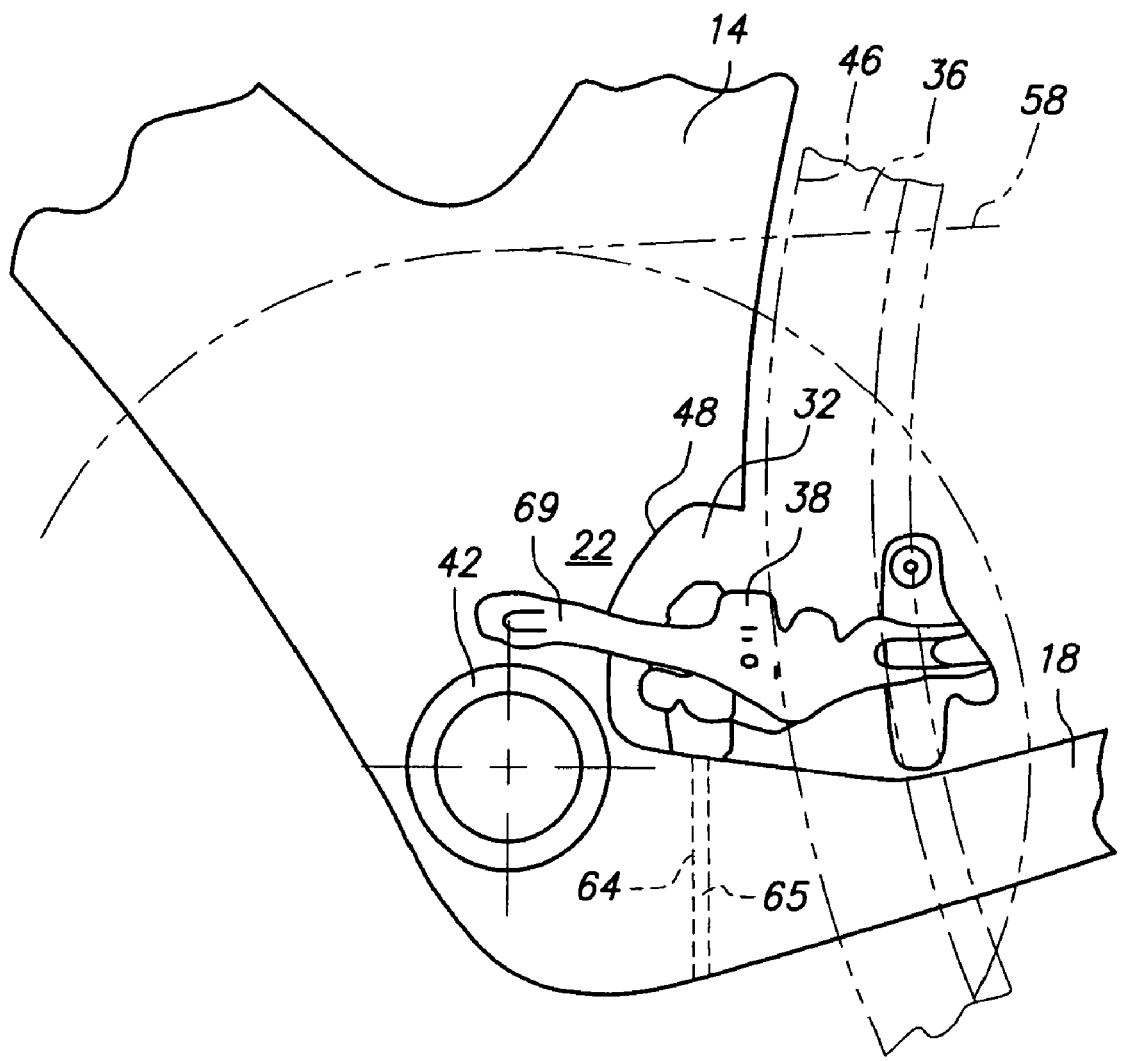
FIG. 1A is an enlarged view of the bottom bracket region shown in FIG. 1.

The standard side pull rear brake 38 when positioned on top of the chain stays 18 and below the drive portion of the chain may have an actuating arm 69 on the non-drive side of the bicycle (see FIGS. 1A and 2). The phantom lines 71 shown in FIG. 2 illustrate the front chain rings and indicate the drive side of the bicycle frame. The non-drive side of the bicycle frame 10 has sufficient space to allow the rear brake actuating arm 69 to be traversable between a braking position and a released position when the brake handle located on the handlebar is depressed or released.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A bicycle having a rear wheel, the rear wheel having a rim, the bicycle comprising:
    a frame including a chainstay member and a bottom bracket region, the chainstay member structurally connecting a rear dropout to the bottom bracket region;
    a chain disposed on a drive-side or the bicycle for driving the rear wheel; and
    a side pull bicycle rear rim caliper brake with an actuating mechanism on a non-drive-side of the frame when mounted to the frame, the side pull bicycle rear rim brake caliper being disposed below a drive portion of the chain and above the chainstay member for mitigating drag coefficient of the bicycle, and wherein brake pads of the side pull bicycle rear rim caliper brake are disposed on opposed sides of the rim of the rear wheel and clamp down on opposed sides of the rim of the rear wheel to slow down the bicycle.

2. The bicycle of claim 1 wherein the frame further comprises a seat tube, the seat tube and the chain stay member defines a cavity, the side pull bicycle rear rim caliper brake is mounted at the bottom bracket region of the frame and disposed within the cavity, the side pull bicycle rear rim caliper brake having brake pads being engageable with the rim of the rear wheel to apply a braking force to the rear wheel.

3. The bicycle of claim 2 wherein disposing the side pull bicycle rear rim caliper brake below a drive portion of the chain and above the chain stay member does not increase the aerodynamic drag on the bicycle.

4. The bicycle of claim 2 wherein a front portion of the chain stay member is at a lower elevation compared to a bottom bracket shell for providing a space to fit the side pull bicycle rear rim caliper brake.

5. The bicycle of claim 2 wherein the side pull bicycle rear rim caliper brake is mounted to the chain stay member.

6. The bicycle of claim 2 further comprising a seat stay member of the frame fabricated in a flexible manner insufficient to mount the side pull bicycle rear rim caliper brake thereto but sufficient for absorbing shocks to the frame.

7. The bicycle of claim 2 wherein the bottom bracket region has a width approximately a width of the side pull bicycle rear rim caliper brake such that air flow is directed around the side pull bicycle rear rim caliper brake.

8. The bicycle of claim 2 wherein a center of gravity of the bicycle frame is lowered by positioning the front portion of the chain stay member at a lower elevation compared to the rear portion of the chain stay member.

9. The bicycle of claim 6 wherein a center of gravity of the bicycle frame is lowered by positioning the side pull bicycle rear rim caliper brake at a lower elevation compared to the seat stay.

10. A bicycle having a front wheel and a rear wheel, the rear wheel having a rim and a hub, the bicycle comprising:
    a frame including a chain stay member, a rear dropout, a seat tube, the chain stay member and the seat tube intersecting at a bottom bracket region;
    a chain disposed on a drive-side of the frame for driving the rear wheel and defining a drive portion; and
    a side pull caliper rim brake mounted closer to the bottom bracket region than the rear dropout, and the side pull caliper rim brake is mounted below the drive portion of the chain and above the chain stay member.

11. The bicycle of claim 10 wherein the side pull caliper rim brake is engageable with the rear wheel rim to apply a braking force to the rear wheel.

12. The bicycle of claim 10 wherein disposing the side pull caliper rim brake below a drive portion of a chain and above the chain stay member does not increase the aerodynamic drag on the bicycle.

13. The bicycle of claim 10 wherein the bottom bracket region defining a width extending between the drive-side of the bicycle and the non-drive-side of the bicycle, the side pull caliper rim brake including a pair of brake pads disposable on opposed sides of the rear wheel within the bottom bracket region width to direct air flow around the brake pads when the bicycle moves in a forward direction.

14. The bicycle of claim 10 wherein the side pull caliper run brake is mounted to the chain stay member.

15. The bicycle of claim 10 further comprising a seat stay member connected to the seal tube and fabricated in a flexible manner insufficient to mount the side pull caliper rim brake thereto but sufficient for absorbing shocks to the frame.

16. The bicycle of claim 10 wherein a center of gravity of the bicycle frame is lowered by positioning the front portion of the chain stay member at a lower elevation compared to the rear portion of the chain stay member.

17. The bicycle of claim 10 wherein the side pull caliper rim brake has brake pads positioned to apply a braking force to the rim of the rear wheel.

18. The bicycle of claim 10 wherein the side pull caliper rim brake is attached to the bottom bracket region.

19. A frame for a bicycle with a standard side pull rim caliper brake, crank arms and a chain defining a drive portion being mountable to the frame, the frame comprising:
 a chain stay member and a seat tube defining a bottom bracket region and a cavity at an intersection of the chain stay member and the seat tube wherein the standard side pull rim caliper brake is mountable at the bottom bracket region within the cavity and cable arms are disposable on a non drive side of the frame.

20. The frame of claim 19 wherein the chain stay member has a mounting feature for mounting the standard side pull rim caliper brake to the chain stay.

* * * * *